United States Patent [19]
Long, Jr.

[11] 3,818,229
[45] June 18, 1974

[54] RADIOPAQUE AGENTS COMPRISING BROMINATED PERFLUOROCARBONS

[75] Inventor: David M. Long, Jr., Villa Park, Ill.

[73] Assignee: University of Illinois Foundation, Urbana, Ill.

[22] Filed: Dec. 21, 1970

[21] Appl. No.: 100,293

[52] U.S. Cl............... 250/312, 250/323, 250/503, 250/510, 252/408, 252/478, 260/653
[51] Int. Cl............................ C09k 3/00, G01t 1/00
[58] Field of Search ................. 252/408, 478, 3, 8; 250/108 R, 312, 323, 503, 510, 83 R, 83 SA; 424/5; 260/653

[56] References Cited
UNITED STATES PATENTS

| | | | |
|---|---|---|---|
| 2,890,244 | 6/1959 | Storbeck............................ 424/5 X |
| 3,055,453 | 9/1962 | Smeltz............................ 260/653 X |
| 3,228,894 | 1/1966 | Jeckel................................ 252/478 |
| 3,316,407 | 4/1967 | Ichikawa.......................... 250/108 R |
| 3,341,417 | 9/1967 | Sinaiko........................... 250/108 R |
| 3,362,874 | 1/1968 | Regan............................ 260/653 X |
| 3,377,393 | 4/1968 | Yale.................................... 260/653 |
| 3,381,042 | 4/1968 | Yale.................................... 260/653 |
| 3,456,024 | 7/1969 | Lorce................................. 260/653 |
| 3,489,898 | 1/1970 | Alburger........................ 250/408 X |
| 3,509,061 | 4/1970 | Zisman........................... 260/653 X |
| 3,609,074 | 5/1971 | Rainaldi................................ 252/3 |
| 3,653,130 | 4/1972 | Eiseman................................ 252/8 |
| 3,656,553 | 4/1972 | Rainaldi et al..................... 252/3 X |

*Primary Examiner*—Charles E. Van Horn
*Attorney, Agent, or Firm*—Merriam, Marshall, Shapiro & Klose

[57] ABSTRACT

Brominated perfluorocarbons exhibit radiopaque properties and are useful, for example, in radiologic processes for discovering flaws or defects in materials or structures.

12 Claims, No Drawings

RADIOPAQUE AGENTS COMPRISING BROMINATED PERFLUOROCARBONS

The present invention relates to radiopaque agents. In general, it concerns a new class of radiopaque agents comprising brominated perfluorocarbons and to radiologic processes employing such agents.

The use of X-rays for the scientific examination of various materials and structures has long been known. Many such industrial applications are found in the aircraft industry wherein metallic components of aircraft are subjected to X-ray procedures, i.e., radiology, or roentgenology, primarily as a safety measure, to discover any flaws or defects in the materials or structure of the component. Such procedures are not, however, generally applicable to materials, e.g., plastic, through which X-rays pass substantially uninhibited. These latter materials are referred to herein as "substantially non-radiopaque materials".

In order to apply radiologic procedures to substantially non-radiopaque materials, it is necessary to use a radiopaque agent.

As employed herein, the term "radiopaque agent" means a substance which functions as a contrast media permitting X-ray visualization of one or more desired parts of a material.

Brominated perfluorocarbons can be generally characterized as compounds which are chemically inert, nonionic, exhibit low viscosity, and are highly volatile, immiscible and insoluble. In addition, I have discovered that such compounds exhibit radiopaque properties. As a result, such compounds can be used as radiopaque agents in a wide variety of radiologic processes.

Briefly, the improved radiopaque agents of the present invention comprise bromoperfluorocarbons. Bromoperfluorocarbons found suitable for use generally comprise monobrominated or dibrominated, cyclic or acyclic (aliphatic) perfluorocarbons. For example, the radiopaque agents of the present invention may comprise perfluoroalkylbromides in which the alkyl group contains about two to 10 carbon atoms. A particularly preferred radiopaque agent is perfluoroctylbromide, having the formula $CF_3(CF_2)_6CF_2Br$.

Bromoperfluorocarbons, and their methods of manufacture are known and, per se, form no part of the present invention. Kirk-Othmer, *Encyclopedia of Chemical Technology*, Vol. 9, p. 748-750, Second Edition, describes, for example, the manufacture of aliphatic bromofluorocarbons.

The radiopaque agents of the present invention are liquid materials at ambient temperatures and are generally in the liquid state when used. For example, the radiopaque agent can be used as a pure liquid without any other materials or can also be used as a solution or an emulsion or suspension in which small particles of the radiopaque agent are dissolved, suspended or dispersed in a suitable vehicle or carrier, for example, water.

The radiopaque agents of the present invention are used by contacting a material (or structure) to be examined by X-rays. The application of the radiopaque agent to the material can be done by any desired method, e.g., spraying, dipping, rolling and the like, which enables the radiopaque agent to reach all the desired areas of the material to be examined. Flaws, cracks, crevices and other imperfections in the material are generally very easily reached by the radiopaque agent as a result of the very low surface tension properties of bromoperfluorocarbons.

Due to the chemical inertness of the radiopaque agents of the present invention, there is no damage or destruction to the material to which it is applied.

After the material to be examined is exposed to X-rays and a roentgenogram, for example, is taken of the material in order to detect variations in contrast, the radiopaque agent can be readily removed from the material by evaporation. The rate of such evaporation can, of course, be controlled by techniques known in the art. The radiopaque agents of the present invention evaporate completely, leaving no residue.

Numerous substantially non-radiopaque materials, including structures and devices, can be examined by radiologic procedures using the radiopaque agents of the present invention. For example, plastic articles such as aircraft windshields may be examined for cracks which are not otherwise readily apparent. Prosthetic heart devices, commonly called pacemakers, may be tested prior to implantation to discover imperfections. Many other uses will be apparent to those skilled in the art.

In addition to being employed in the liquid form, i.e., as either a pure liquid (100% active ingredient), a solution, or an emulsion, the radiopaque agents of the present invention may also be employed in the form of an aerosol. In this latter embodiment, the normally liquid radiopaque agent is confined in a container, under pressure, with one or more suitable aerosol propellents. Suitable propellents are well known in the aerosol formulation art and include, for example, fluorinated hydrocarbons such as Propellents "11", "12", "114" and "318". One such aerosol formulation comprises about 10 parts by weight $CF_3(CF_2)_6CF_2Br$ and about 50 parts by weight "Freon 12."

The present invention can be further understood by reference to the following illustrative examples.

EXAMPLE I

The following brominated perfluorocarbons were found to have the indicated radiopaque properties, expressed as "opacity". As a standard of comparison, "Conray" has an opacity value of 0.8.

| Formula | Opacity |
|---|---|
| $CF_3(CF_2)_6CF_2Br$ | 0.42 |
| $CF_3(CF_2)_4CF_2Br$ | 0.50 |
| $Br(CF_2)_4Br$ | 0.81 |
| $Br(CF_2)_2Br$ | 10.2 |
| 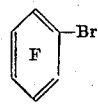 | 0.56 |
| 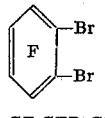 | 0.71 |
| $CF_3CFBrCF_2Br$ | 0.86 |

EXAMPLE II

A radiopaque aerosol formulation comprising about 20 wt. percent $Br(CF_2)Br$ and about 80 wt. percent propellent (Freon 12) is sprayed onto the surfaces of a pacemaker. The pacemaker is then exposed to X-rays and a roentgenogram is obtained. The roentgenogram is then examined to determine any imperfections in the pacemaker.

While the present invention has been described with reference to the above examples, it is not to be limited thereto. Modifications within the spirit and scope of the invention will be apparent to those skilled in the art.

What is claimed is:

1. In a process for the radiologic examination of an inanimate object, the improvement comprising contacting said object in all areas to be examined with a radiopaque agent comprising a monobrominated or dibrominated aliphatic or cyclic perfluorocarbon having two to ten carbon atoms in its molecule.

2. A process as defined by claim 1 wherein said brominated perfluorocarbon comprises a monobrominated perfluorocarbon.

3. A process as defined by claim 1 wherein said brominated perfluorocarbon comprises a dibrominated perfluorocarbon.

4. A process as defined by claim 1 wherein said brominated perfluorocarbon is a monocyclic compound.

5. A process as defined by claim 1 wherein said brominated perfluorocarbon is an aliphatic compound.

6. A process as defined by claim 1 wherein said brominated perfluorocarbon contains six to eight carbon atoms.

7. A process as defined by claim 1 wherein said brominated perfluorocarbon is $CF_3(CF_2)_6CF_2Br$.

8. A process as defined by claim 1 wherein said brominated perfluorocarbon is

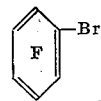

9. In a process for radiologically examining an essentially non-radiopaque static material the improvement comprising contacting said material in all areas to be examined with a radiopaque monobrominated or dibrominated aliphatic or cyclic perfluorocarbon having two to ten carbon atoms in its molecule, exposing the thus contacted material to X-rays, and detecting the variations in contrast manifest by said contacted material.

10. A process as defined by claim 9 wherein said essentially non-radiopaque material comprises a thermosetting plastic material.

11. A process as defined by claim 9 wherein said material comprises a prosthetic heart device.

12. A process for radiologically examining a static material comprising (a) contacting at least the portion of the material to be examined with a radiopaque agent comprising a monobrominated or dibrominated aliphatic or cyclic perfluorocarbon having two to ten carbon atoms in its molecule (b) subjecting the thus contacted material to X-rays and (c) thereafter permitting said radiopaque agent to completely evaporate, leaving the contacted material free of residue.

* * * * *

PO-1050
(5/69)

UNITED STATES PATENT OFFICE
CERTIFICATE OF CORRECTION

Patent No. 3,818,229  Dated June 18, 1974

Inventor(s) David M. Long, Jr.

It is certified that error appears in the above-identified patent and that said Letters Patent are hereby corrected as shown below:

Column 2, line 51, "10.2" should be --1.02--.

Signed and sealed this 8th day of October 1974.

(SEAL)
Attest:

McCOY M. GIBSON JR.
Attesting Officer

C. MARSHALL DANN
Commissioner of Patents